US006971955B2

(12) United States Patent
Baerlocher et al.

(10) Patent No.: US 6,971,955 B2
(45) **Date of Patent: *Dec. 6, 2005**

(54) GAMING DEVICE HAVING APPARATUS AND METHOD FOR PRODUCING AN AWARD THROUGH AWARD ELIMINATION OR REPLACEMENT

(75) Inventors: Anthony J. Baerlocher, Reno, NV (US); Lance R. Peterson, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/386,891

(22) Filed: Mar. 12, 2003

(65) Prior Publication Data

US 2003/0181233 A1 Sep. 25, 2003

Related U.S. Application Data

(60) Division of application No. 10/173,283, filed on Jun. 17, 2002, now Pat. No. 6,575,830, which is a continuation of application No. 09/686,283, filed on Oct. 11, 2000, now Pat. No. 6,413,161.

(51) Int. Cl.[7] .............................................. A63F 13/00
(52) U.S. Cl. .......................... 463/20; 463/9; 173/138.1
(58) Field of Search .......................... 463/9–13, 16–20; 273/138.1, 143 R, 269, 292

(56) References Cited

U.S. PATENT DOCUMENTS

| | | | | |
|---|---|---|---|---|
| 4,695,053 A | | 9/1987 | Vazquez, Jr. et al. | |
| 5,033,744 A | * | 7/1991 | Bridgeman et al. | 463/13 |
| 5,092,598 A | * | 3/1992 | Kamille | 273/139 |
| 5,205,555 A | | 4/1993 | Hamano | |
| 5,342,047 A | | 8/1994 | Heidel et al. | |
| 5,449,173 A | | 9/1995 | Thomas et al. | |
| 5,536,016 A | | 7/1996 | Thompson | |
| 5,704,835 A | * | 1/1998 | Dietz, II | 463/20 |
| 5,823,873 A | | 10/1998 | Moody | |
| 5,855,514 A | * | 1/1999 | Kamille | 463/17 |
| 5,873,781 A | | 2/1999 | Keane | |
| 5,931,467 A | * | 8/1999 | Kamille | 273/139 |

(Continued)

FOREIGN PATENT DOCUMENTS

EP 0874337 A1 10/1998

(Continued)

OTHER PUBLICATIONS

Winning Streak Brochure written by Aristocrat Leisure Industries, published in 1994.

(Continued)

*Primary Examiner*—Scott Jones
(74) *Attorney, Agent, or Firm*—Bell, Boyd & Lloyd, LLC

(57) ABSTRACT

The present invention provides a bonus round of gaming device in which the player either wins that which the player does not select or the player selectively replaces one award with another award with the hopes of maximizing an ultimate award. In the embodiment wherein the player wins that which the player does not select, one or more selections are made from the plurality of symbols, and the game provides awards assigned to the unselected choices or symbols. In the replacement embodiment, the game replaces the award of a selected symbol with an alternative type of award. In one example, the awards assigned to the unselected symbols are gaming device credits, while the converted or replaced awards assigned to selected symbols are multipliers. After replacement, the game sums the credits, sums the multipliers and multiplies the credits by the multipliers to produce an ultimate award.

21 Claims, 8 Drawing Sheets

U.S. PATENT DOCUMENTS

| | | | | |
|---|---|---|---|---|
| 5,967,894 | A | 10/1999 | Kinoshita et al. | |
| 5,984,781 | A | 11/1999 | Sunaga | |
| 5,996,997 | A * | 12/1999 | Kamille | 273/139 |
| 6,015,346 | A | 1/2000 | Bennett | |
| 6,033,307 | A | 3/2000 | Vancura | |
| 6,056,642 | A | 5/2000 | Bennett | |
| 6,089,976 | A | 7/2000 | Schneider et al. | |
| 6,089,977 | A | 7/2000 | Bennett | |
| 6,102,798 | A | 8/2000 | Bennett | |
| 6,120,378 | A * | 9/2000 | Moody et al. | 463/20 |
| 6,126,542 | A | 10/2000 | Fier | |
| 6,142,874 | A | 11/2000 | Kodachi et al. | |
| 6,159,097 | A | 12/2000 | Gura | |
| 6,159,098 | A * | 12/2000 | Slomiany et al. | 463/25 |
| 6,164,652 | A | 12/2000 | Lauretta et al. | |
| 6,174,235 | B1 | 1/2001 | Walker et al. | |
| 6,190,255 | B1 * | 2/2001 | Thomas et al. | 463/20 |
| 6,237,913 | B1 * | 5/2001 | Kamille | 273/139 |
| 6,290,600 | B1 * | 9/2001 | Glasson | 463/20 |
| 6,302,790 | B1 | 10/2001 | Bossard | |
| 6,346,043 | B1 | 2/2002 | Colin et al. | |
| 6,358,147 | B1 * | 3/2002 | Jaffe et al. | 463/20 |
| 6,364,766 | B1 * | 4/2002 | Anderson et al. | 463/16 |
| 6,413,161 | B1 * | 7/2002 | Baerlocher et al. | 463/20 |
| 6,439,993 | B1 * | 8/2002 | O'Halloran | 463/16 |
| 6,443,837 | B1 * | 9/2002 | Jaffe et al. | 463/16 |
| 6,575,830 | B2 * | 6/2003 | Baerlocher et al. | 463/20 |
| 6,641,477 | B1 * | 11/2003 | Dietz, II | 463/20 |
| 2001/0040341 | A1 * | 11/2001 | Kamille | 273/138.1 |
| 2003/0036418 | A1 * | 2/2003 | Seelig et al. | 463/16 |
| 2003/0040351 | A1 * | 2/2003 | Colin et al. | 463/11 |

FOREIGN PATENT DOCUMENTS

| | | | |
|---|---|---|---|
| EP | 0945837 | A2 | 9/1999 |
| EP | 0984409 | A2 | 3/2000 |
| JP | 10-328351 | | 12/1998 |

OTHER PUBLICATIONS

Jackpot Party Brochures and Articles written by WMS Gaming, Inc., published in 1998.

Caribbean Gold II Brochure written by Aristocrat Leisure Industries, published in 1998.

Little Green Men Brochure and Article written by IGT/ Strictly Slots, published in 2000.

* cited by examiner

86

AVERAGE MULTIPLIER = 3X

88

CHOOSE 4 MULTIPLIERS: (25) x (3X + 3X + 3X + 3X)
(25) x (12X) = 300

90

CHOOSE 3 MULTIPLIERS: (25 + 20) x (3X + 3X + 3X)
(45) x (9X) = 405

92

CHOOSE 2 MULTIPLIERS: (25 + 20 + 15) x (3X + 3X)
(60) x (6X) = 360

94

CHOOSE 1 MULTIPLIER: (25 + 20 + 15 + 10) x (3X)
(70) x (3X) = 210

96

CHOOSE 0 MULTIPLIERS: (25 + 20 + 15 + 10 + 5) = 75

98

AVERAGE CREDIT IS 10

86

AVERAGE MULTIPLIER IS 3X

100 CHOOSE 4 MULTIPLIERS: 10 x (3X + 3X + 3X + 3X) = 120

102 CHOOSE 3 MULTIPLIERS: (10 + 10) x (3X + 3X + 3X) = 180

104 CHOOSE 2 MULTIPLIERS: (10 + 10 + 10) x (3X + 3X) = 180

106 CHOOSE 1 MULTIPLIER: (10 + 10 + 10 + 10) x (3X) = 120

108 CHOOSE 0 MULTIPLIERS: (10 + 10 + 10 + 10 + 10) = 50

∴ CHOOSE 2 OR 3 MULTIPLIERS

GAMING DEVICE HAVING APPARATUS AND METHOD FOR PRODUCING AN AWARD THROUGH AWARD ELIMINATION OR REPLACEMENT

PRIORITY CLAIM

This application is a divisional of and claims the benefit of U.S. patent application Ser. No. 10/173,283 filed Jun. 17, 2002, now U.S. Pat. No. 6,575,830 which is a continuation of and claims the benefit of U.S. patent application Ser. No. 09/686,283, filed Oct. 11, 2000, U.S. Pat. No. 6,413,161.

CROSS REFERENCES TO RELATED APPLICATIONS

This application is related to the following commonly-owned co-pending patent applications: "GAMING DEVICE HAVING A SCHEME WITH MULTIPLE SELECTION GROUPS," Ser. No. 09/656,702, now U.S. Pat. No. 6,439, 994; "GAMING DEVICE WITH PRIZE BONUS SCHEME HAVING MULTIPLE AWARD LEVELS," Ser. No. 09/602,140, "GAMING DEVICE HAVING AN INDICATOR SELECTION WITH PROBABILITY-BASED OUTCOME BONUS SCHEME," Ser. No. 09/605,809, now U.S. Pat. No. 6,315,664; "GAMING DEVICE WITH BONUS SCHEME PROVIDING INCREASED REWARD FOR SELECTING RELATED SYMBOLS" Ser. No. 09/605,023, "GAMING DEVICE HAVING AN AWARD EXCHANGE BONUS ROUND AND METHOD FOR REVEALING AWARD EXCHANGE POSSIBILITIES," Ser. No. 09/689,510, "GAMING DEVICE HAVING A MULTI-ROUND BONUS SCHEME WHEREIN EACH ROUND HAS A PROBABILITY OF SUCCESS," Ser. No. 09/688,441, "GAMING DEVICE HAVING GRADUATING AWARD EXCHANGE SEQUENCE WITH A TEASE CONSOLATION SEQUENCE AND AN INITIAL QUALIFYING SEQUENCE," Ser. No. 09/680,601, "GAMING DEVICE HAVING MULTIPLE CHOICE LARGE AWARD BONUS SCHEME," Ser. No. 09/686,284, "GAMING DEVICE HAVING RELATED MULTI-GAME BONUS SCHEME," Ser. No. 09/688,972, "GAMING DEVICE HAVING AN INDICATOR SELECTION WITH PROBABILITY-BASED OUTCOME BONUS SCHEME," Ser. No. 09/981,163, "GAMING DEVICE HAVING A BONUS SCHEME INCLUDING A PLURALITY OF SELECTION GROUPS WITH WIN-GROUP OUTCOMES", Ser. No. 09/981,084, "GAMING DEVICE HAVING AN ELEMENT AND ELEMENT GROUP SELECTION AND ELIMINATION BONUS SCHEME," Ser. No. 09/689,381, "GAMING DEVICE HAVING AN INDICATOR SELECTION WITH PROBABILITY-BASED OUTCOME," Ser. No. 09/990,693, "GAMING DEVICE HAVING A BONUS SCHEME WITH MULTIPLE SELECTION GROUPS," Ser. No. 10/195,292, and "GAMING DEVICE HAVING A BONUS SCHEME WITH MULTIPLE SELECTION GROUPS," Ser. No. 10/243,047.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device comprising an apparatus and method for providing a player an award through the elimination and/or replacement of one or more awards.

BACKGROUND OF THE INVENTION

Gaming devices and bonus rounds of gaming devices generally provide positive responses to inputs such as a player's selection. That is, when a player makes a choice in a gaming device by pressing a button or using another input device, the game normally continues play or awards a value associated with the button or input device. The player keeps or wins that which the player chooses. One example of such a game is a video poker game. In a standard video poker game, for example, the game deals the player a plurality of cards, the player selects one or more desired cards and the game continues play with the selected cards.

In known bonus games, when the game or player chooses from a plurality of awards, the game discards, discontinues using or does not award that which the player does not choose. European Patent Application No. EP 0 945 837 A2 filed on Mar. 18, 1999 and assigned on its face to WMS Gaming, Inc. discloses a bonus scheme of this type. A player has one or more opportunities to choose masked bonus awards from a group of symbols displayed to the player. When the player chooses a masked symbol, the game removes the mask and either awards the player with a bonus value or terminates the bonus round. The outcome depends upon whether the player selects an award or a terminator. To increase excitement and enjoyment, the game may reveal the contents of unselected symbols, however, the values of the unselected symbols do not mathematically factor into the player's award.

Gaming machines may also include bonus rounds in which the gaming device uses unselected awards, however, such uses do not involve mathematically applying the value of the unselected award. Foreign patent WO9732285 entitled, Slot Machine Game with Roaming Wild Card, having a publication date of Sep. 4, 1997, discloses an example. In this application, a slot machine having a video display contains a plurality of rotatable reels with game symbols. When the player receives a triggering symbol or combination, the game produces a bonus symbol. The bonus symbol roams from game symbol to game symbol temporarily changing the game symbol to a bonus symbol. If the change results in a winning combination, the player receives an award. The unselected symbols (i.e., ones which the bonus symbol does not change) are thus used here to form a winning combination and not to mathematically figure into an award value.

SUMMARY OF THE INVENTION

The gaming device of the present invention provides a gaming device having a bonus round which provides the player with a plurality of choices or symbols having indicia relating to a theme of the gaming device. Each of the choices or symbols masks an award that is assigned or associated with the choice or symbol. One or more selections are made from the plurality of choices or symbols. The game awards the player each of the awards assigned or associated with the unselected choices or symbols. In this embodiment, the game eliminates, discards or ignores, and preferably reveals, the selected choices or symbols. Thus, in this embodiment of the present invention, the player wins that which the player does not select.

In another embodiment of the present invention, the game does not discard or ignore the selected choices or symbols. The act of selecting a choice or symbol changes or replaces, rather than eliminates, the award of the selected choice or symbol. In one example, the awards associated or assigned to the unselected choices or symbols are gaming device credits, while the awards associated or assigned to selected choices or symbols are modifiers such as multipliers. In another example, the opposite occurs, wherein the unselected choices or symbols are modifiers such as multipliers and the selected choices or symbols are game credits. In both cases, the game preferably sums the credits, sums the multipliers and multiplies the total credits by the total multipliers to produce an ultimate award.

For either embodiment, the present invention contemplates three general ways or methods by which choices or selectors are chosen. In one selection method, the game enables the player to select one or more choices or selectors. In the first embodiment, wherein the player receives that which the player does not choose, the game preferably directs the player to make a set number of selections because the player does not otherwise want to choose and eliminate any more awards than the player has to. In the second embodiment, wherein the game changes or replaces a selected symbol, the game preferably enables the player to convert as many awards as the player desires. The player has to choose between credits or multipliers.

In a second selection method, the game randomly selects a set or random number of symbols. In either of the elimination or replacement embodiments, the game makes the selections randomly or blindly and does not attempt to favor or disfavor the player.

In a third selection method, the game strategically selects one or more of the symbols. The strategic selection method primarily applies to the second embodiment, wherein the game changes a selected symbol. The game processor may determine the strategy of how many selections to give the player depending upon the results of the previous selections. The strategy is preferably pre-determined by the processor and it may be optimally calculated to enhance the enjoyment and reward the player. The determination of the strategy may also be allowed to be determined by the player after each selection. An astute and aggressive player, after playing the replacement bonus round, can determine the optimum method for determining the number of symbols to select and thereby choosing the number of credits or multipliers the player wishes to obtain. Generally, the player does so by determining, after playing the bonus round and mapping the awards, the average value of the multipliers and the credits and iteratively plugging in selected values into a suitable equation to determine whether or not to change another symbol (i.e., from a credit to a multiplier or from a multiplier to a credit.) The present invention further contemplates programming a processor of the gaming device to strategically select and change or replace symbols according to the optimum method, so as to attempt to maximize the player's award.

It is therefore an object of the present invention to provide a gaming device, wherein the game provides awards from unselected choices rather than from selected choices.

Another object of the present invention is to provide a gaming device, wherein the game combines selected and unselected values to determine a player's award.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
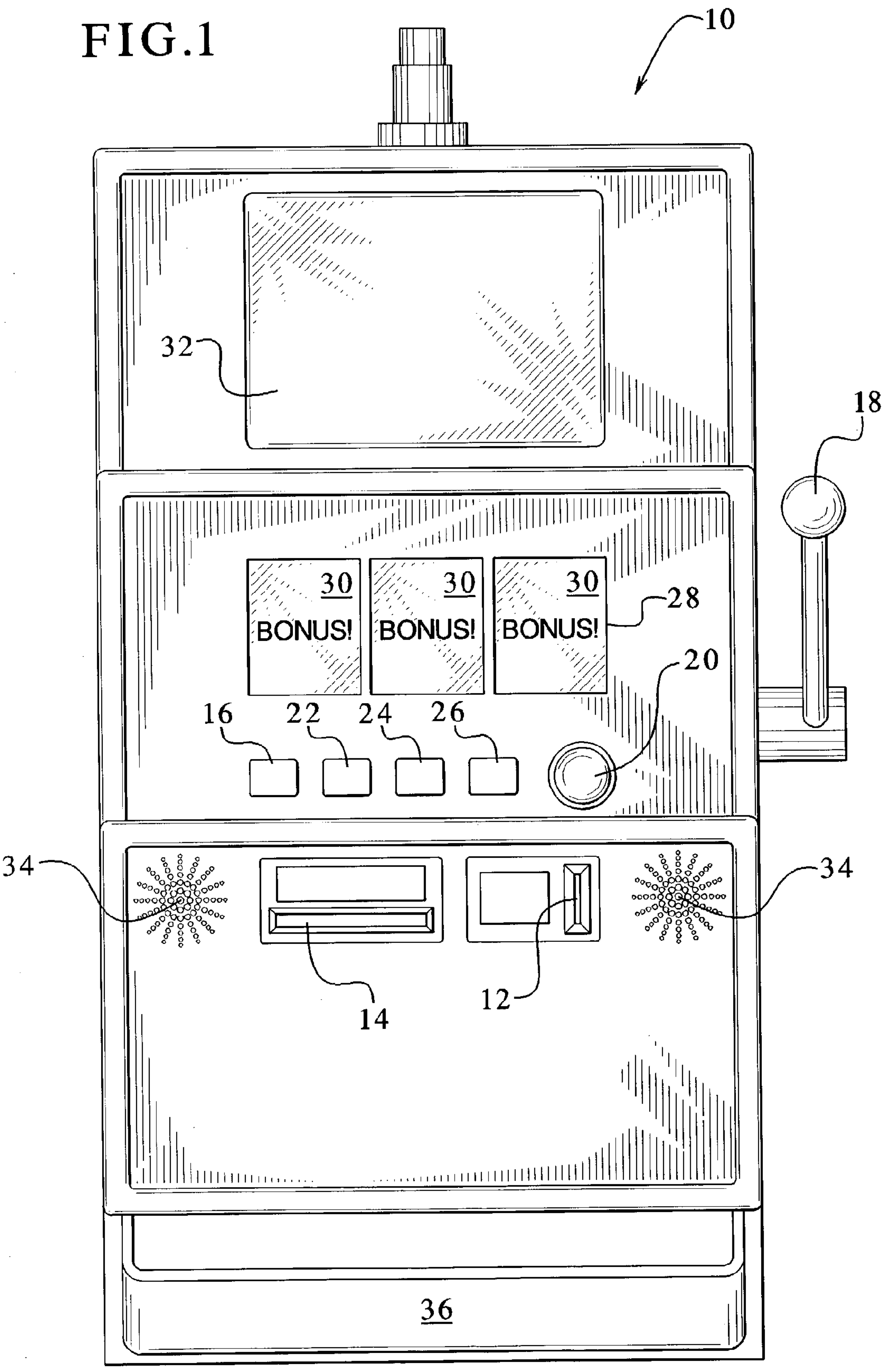
FIG. 1 is a front plan view of a general embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) that a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform. Gaming device 10 can incorporate any game such as slot, poker or keno. The symbols used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. The present invention preferably employs or uses credits, however, the present invention is not limited to the use of credits and contemplates employing other units of value such as money. For purposes of describing and claiming this invention, the term "credit" includes any unit of value such as a gaming device credit or actual money.

After depositing the appropriate amount of money, a player can begin the game by pulling arm 18 or by pushing play button 20. Play button 20 can be any play activator used by the player which starts any game or sequence of events in the gaming device.

Referring to FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a paystop display 28 which contains a plurality of reels 30, preferably three to five reels in mechanical or video form. Each reel 30 displays a plurality of symbols such as bells, hearts, martinis, fruits, cactuses, numbers, cigars, letters, bars or other images, which preferably correspond to a theme associated with the gaming device 10. If the reels 30 are in video form, the gaming device 10 preferably displays the video reels 30 in a display device described below. Furthermore, gaming device 10 preferably includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards that keep track of the player's credits.

With respect to electronics, the controller of gaming device 10 preferably includes the electronic configuration generally illustrated in FIG. 2, which has: a processor 38; a memory device 40 for storing program code or other data; a display device 32 (i.e., a liquid crystal display) described below; a plurality of speakers 34; and at least one input device as indicated by block 33. The processor 38 is preferably a microprocessor or microcontroller-based platform that is capable of displaying images, symbols and other indicia such as images of people, characters, places, things and faces of cards. The memory device 40 can include random access memory (RAM) 42 for storing event data or other data generated or used during a particular game. The memory device 40 can also include read only memory (ROM) 44 for storing program code, which controls the gaming device 10 so that it plays a particular game in accordance with applicable game rules and paytables.

Figure 2:
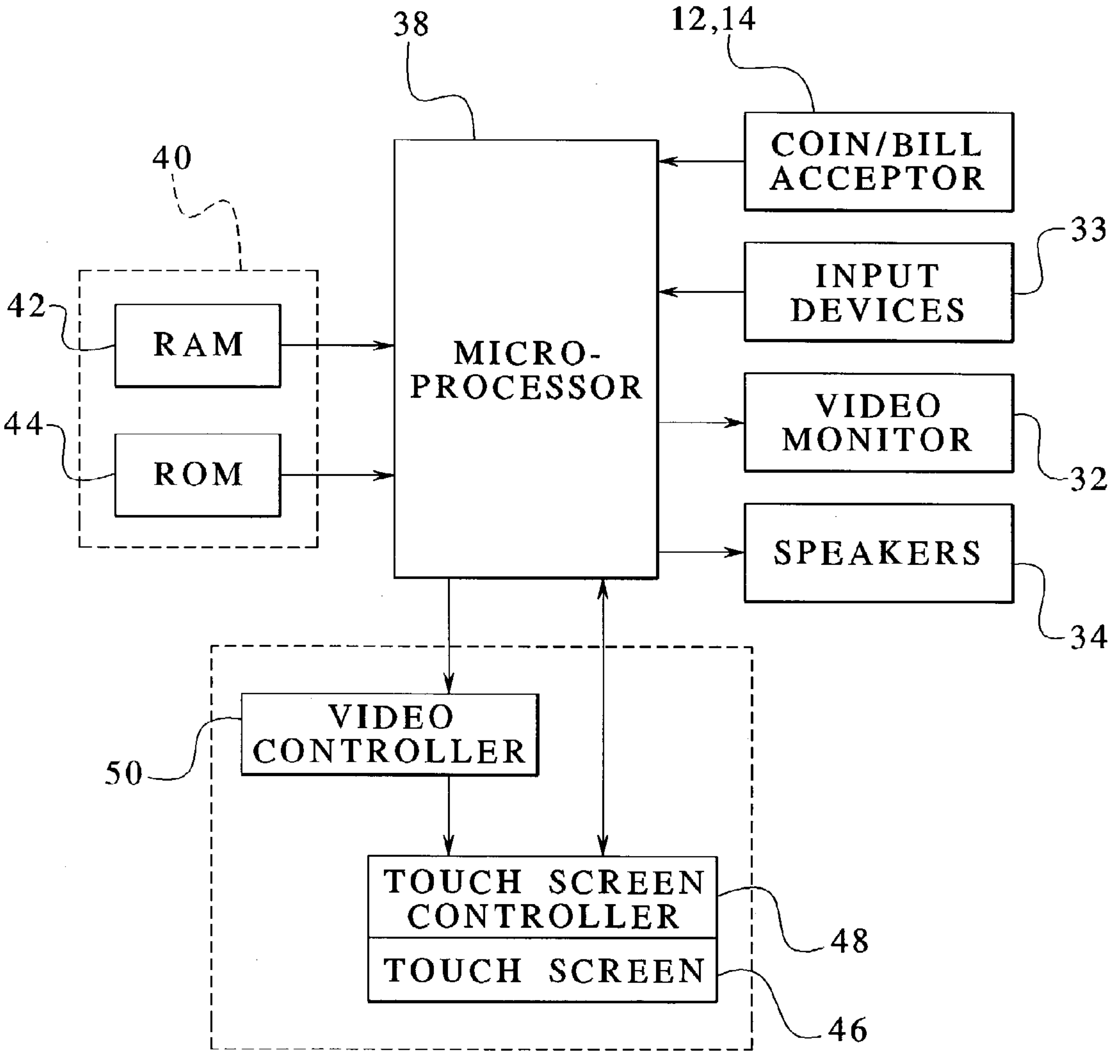
FIG. 2 is a schematic block diagram of the electronic configuration of one embodiment of the gaming device of the present invention.

As illustrated in FIG. 2, the player preferably uses the input devices 33, such as the arm 18, play button 20, the bet one button 24 and the cash out button 26 to input signals into gaming device 10. In certain instances, a touch screen 46 and an associated touch screen controller 48 can be used in conjunction with a display device described in detail below. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hardwired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. For purposes of describing the invention, the controller or computer includes the processor 38 and memory device 40.

Referring to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, gaming device 10 also preferably gives players the opportunity to win credits in a bonus round. This type of gaming device 10 will include a program that will automatically begin a bonus round when the player has achieved a qualifying condition in the game. This qualifying condition can be a particular arrangement of indicia on the display window 28. The gaming device 10 also includes a display device such as a display device 32 shown in FIG. 1 enabling the player to play the bonus round. Preferably, the qualifying condition is a predetermined combination of indicia appearing on a plurality of reels 30. As illustrated in the three reel slot game shown in FIG. 1, the qualifying condition could be the text "BONUS!" appearing in the same location on three adjacent reels.

Elimination Embodiment

Figure 3:
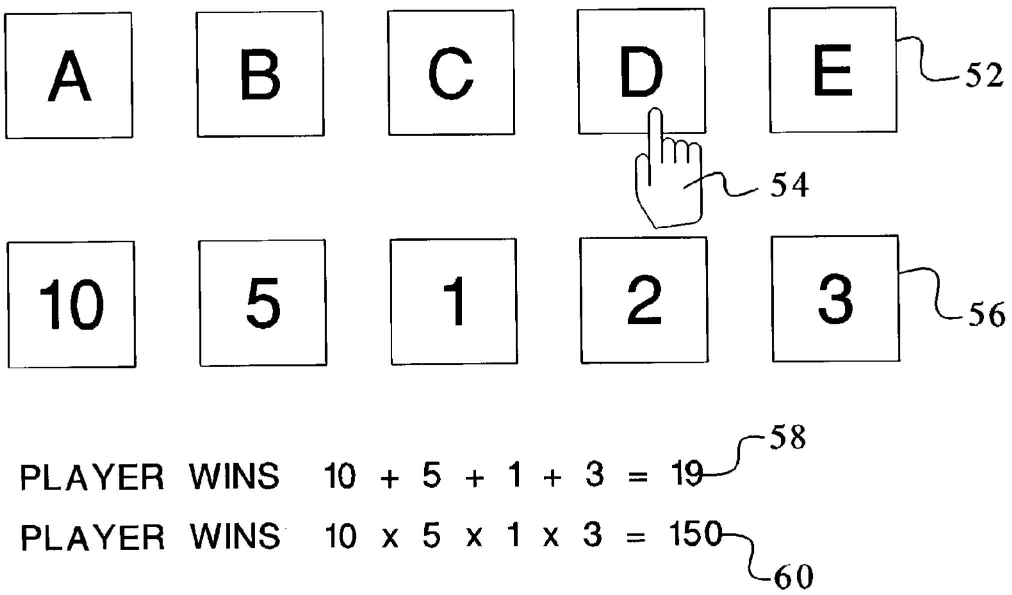
FIG. 3 is a schematic diagram of one example of an elimination embodiment of the present invention, wherein a player or the game selects and eliminates a symbol, and the game awards the remainder of the unselected awards to the player.

Referring now to FIG. 3, one example of the elimination embodiment of the present invention is illustrated, wherein a player or the game selects a symbol or choice, and the game awards the values of the unselected choices. The present example illustrates a player selecting a symbol; however, it should be appreciated that the present invention also contemplates the game selecting one or more symbols.

In the present example, the player or the gaming device makes the selections randomly. The order in which the player or the gaming device eliminates the symbols is preferably unimportant; however, the present invention contemplates prompting the player for each symbol, e.g., left to right, etc.

FIG. 3 illustrates a row of symbols 52, wherein each symbol contains indicia that masks an award. The indicia illustrated by FIG. 3 contain the general symbols, "A" through "E." The game, however, preferably provides indicia that relate to a gaming device theme. FIG. 3 illustrates five symbols; however, the present invention contemplates any number of symbols or choices and as few as two symbols or choices.

Below the row of symbols, a hand 54 of a player illustrates the player selecting the symbol "D" from the row of symbols 52. The game contemplates any apparatus for enabling a player to select one of the masked symbols, including but not limited to: (i) an area of a touch screen 46 dedicated to each of the symbols, each area being adapted to send a different input to a touch screen controller 48; (ii) an electromechanical input device 33 dedicated to each of said symbols; and (iii) a remote control input device for a table top or pub-style machine having a separate signal dedicated to each of said symbols.

After selecting a symbol "D" from the row of symbols 52, the game reveals the awards of the selected symbol "D" as well as the other symbols, as illustrated in the row of symbols 56. The game eliminates, discards or ignores the value 2 of the selected symbol "D." In the present embodiment, the game preferably adds the values of the unselected symbols; namely, 10 from the symbol "A," 5 from the symbol "B," 1 from the symbol "C" and 3 from the symbol "E" for a total of 19, as illustrated by the mathematical operation 58. Alternatively, the game can multiply the value of the unselected symbols for a total of 150, as illustrated by the mathematical operation 60. The values 10, 5, 1 and 3 and the totals 19 and 160 can represent any type of gaming device award. That is, the values can represent gaming device credits, multipliers, a number of selections from a group of values or any other value adding device desired by the implementor.

As illustrated, the game preferably reveals the values of selected and unselected symbols. The game preferably reveals the value of a selected symbol immediately after the player selects a symbol. The game preferably does not reveal the values of unselected symbols until the player finishes selecting, otherwise the player will obviously select and eliminate the lowest values. The game can alternatively reveal only the values of selected symbols, reveal only the values of unselected symbols or not reveal the values of any symbols. It should be appreciated, however, that revealing awards or values increases player excitement and enjoyment.

Figure 4:
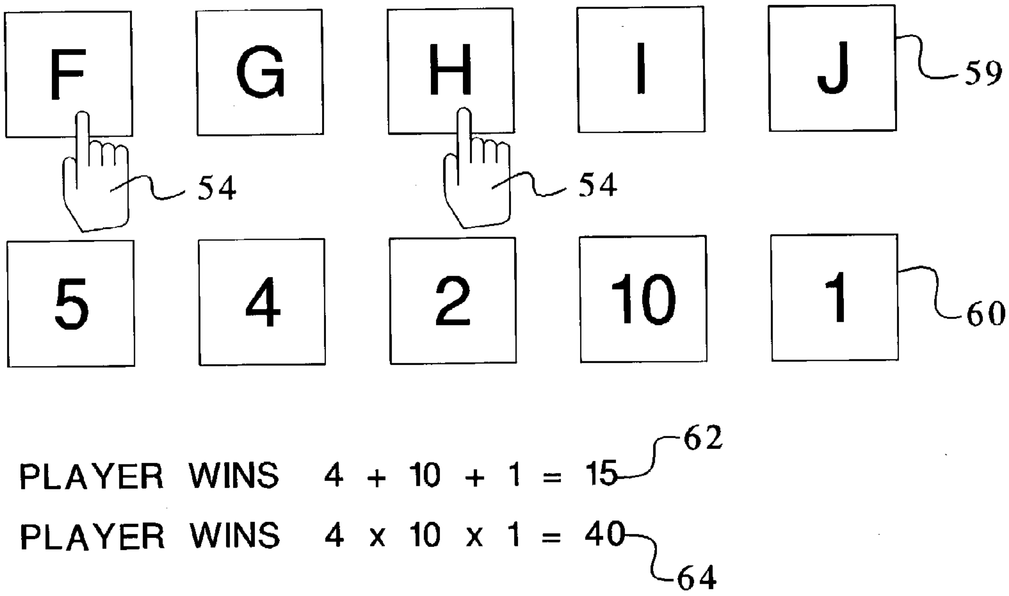
FIG. 4 is a schematic diagram of another example of an elimination embodiment of the present invention, wherein a player or the game selects and eliminates a plurality of symbols, and the game awards the remainder of the unselected awards to the player.

The negative effect of selecting in the elimination embodiment necessitates that the game requires a certain number of selections. That is, if the game enabled selecting symbols and eliminating the values to be selective or optional, the player would obviously choose not to eliminate any values. In an example illustrated by FIG. 4, the game requires that the player select and eliminate two values. It should be appreciated that the game can require the player to select and eliminate any number or percentage of symbols except all the symbols or 100 percent. In FIG. 4, the game provides the symbols "F" through "J" as illustrated in the row of symbols 59. The player 54 selects the "F" symbol and the "H" symbols as required by the game.

The game preferably reveals the 5 value and the 2 value immediately after the player selects the "F" symbol and the "H" symbol, respectively. When the player selects the required number of symbols, the game preferably reveals the unselected components of the player's award; namely, the 4 value from the symbol "G," the 10 value from the symbol "I," and the 1 value from the symbol "J," as illustrated by the row of symbols 60.

The game discards or ignores the 5 value of the selected symbol "F" and the 2 value of the selected symbol "H." In the present embodiment, the game preferably adds the values 4, 10 and 1 of the unselected symbols for a total of 15, as illustrated by the mathematical operation 62. Alternatively, the game can multiply the value of the unselected symbols for a total of 40, as illustrated by the mathematical operation 64. As above, the values 4, 10 and 1 and the totals 15 and 40 can represent any type of gaming device award, including, but not limited to gaming device credits, multipliers, a number of selections from a group of values or any other value adding device desired by the implementor.

The elimination embodiment operates the same as described when the game, rather than the player, randomly selects symbols. The game does not need input devices such as a touch screen when the controller rather than the player selects symbols. The reveal feature is also not limited to revealing selected symbols first since the player has no control over which symbols are selected. In all other respects, the elimination embodiment operates the same whether the player or the game randomly selects symbols.

Random Replacement Embodiment

Figure 5:
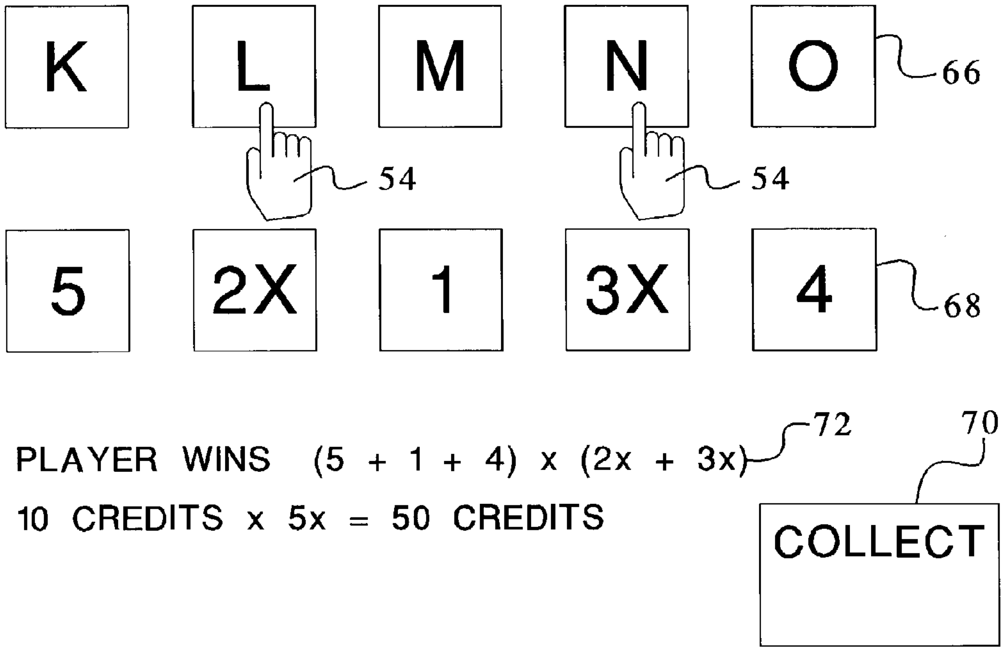
FIG. 5 is schematic diagram of one example of a replacement embodiment of the present invention, wherein a player or the game selects and changes the character of one or more awards from a credit to a multiplier, and the game awards a combination of the awards to the player.

Referring now to FIG. 5, a schematic diagram of one example of a replacement embodiment of the present invention is shown, wherein a player or the game selects and changes the function or character of one or more awards from a credit to a multiplier (or some other modifier). The present example describes a player selecting a symbol. It should be appreciated, however, that the present invention also contemplates the game selecting one or more symbols. In the present example, the player or the gaming device makes the selections randomly. That is, for each symbol, the game or the player guesses as to whether the credit or the multiplier has more value. The order in which the player converts the symbols is preferably unimportant, however, the present invention contemplates prompting the player for each symbol, e.g., left to right, etc.

FIG. 5 illustrates a row of symbols 66, wherein each symbol contains indicia that masks an award. FIG. 5 illustrates the general symbols, "K" through "O," however, the indicia of the present invention preferably relate to a gaming device theme. FIG. 5 illustrates five symbols, however, the present invention contemplates any number of symbols or choices and as few as one symbol or choice.

Below the row of symbols, a plurality of hands of a player 54 illustrate the player selecting the symbols "L" and "N" from the row of symbols 66. The game contemplates any apparatus as described above for enabling a player to select one of the masked symbols. After selecting a symbol "L" from the row of symbols 66, the game preferably reveals the credit award associated with the symbol "L" (not shown) before displaying the replacement of a 2× multiplier as illustrated in the row of symbols 68. Likewise, when the player selects the symbol "N" from the row 66, the game preferably reveals the credit award associated with the symbol "N" (not shown) before displaying the replacement of a 3× multiplier in the row 68.

The game preferably enables the player to randomly replace or convert as many symbols as the player desires. For each of the symbols, "K" through "O," the player decides between a credit or a multiplier. The player can choose not to convert any credits to multipliers. To do so, the game preferably provides a "collect" button 70, which sends a signal to the controller not to convert any more credits and to end the bonus round. The player can convert one or more credits as shown in FIG. 5 (player converts two credits), whereby the player selects the symbols to convert and then selects the collect symbol 70. The player can convert all but one credit to multipliers since the game must have at least one credit value to multiply. If there are five selectable symbols as illustrated in the row 66, the game preferably ends the bonus round immediately upon the conversion of the fourth credit. No collect command 70 is necessary, however, the game can still employ said command.

After the player selects and converts a desired number of credits to multipliers, the game preferably reveals all the unconverted credits; namely, the 5 credit from the symbol "K," the 1 credit from the symbol "M," and the 4 credit from the symbol "O," as illustrated by the row of symbols 68. The game preferably sums the unconverted credits for a total of 10, as illustrated by the mathematical operation 72. Alternatively, the game can multiply the unconverted credits for a total of 20 (not shown).

The game also preferably adds the converted multipliers; namely, the 2× from the symbol "L" and the 3× from the symbol "N" for a total of 5×, as illustrated by the mathematical operation 72. Alternatively, the game can multiply the converted multipliers for a total of 6× (not shown). The game determines an ultimate award by multiplying the total unconverted credits by the total converted multipliers, i.e. 10 credits multiplied by 5 (i.e., 5×) which equals 50 credits as illustrated by the mathematical operation 72.

Figure 6:
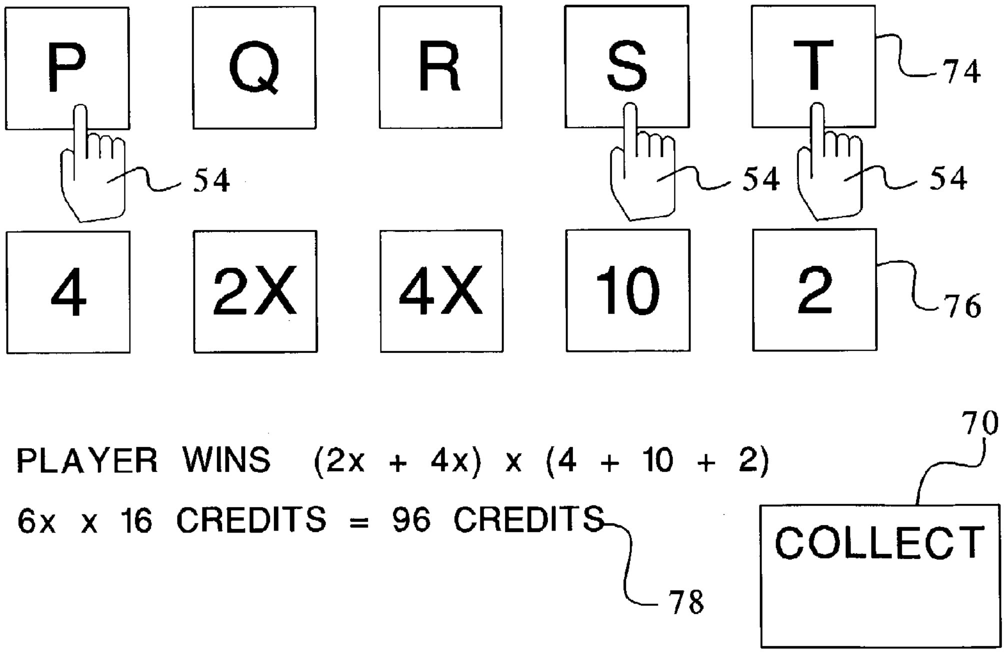
FIG. 6 is schematic diagram of another example of a replacement embodiment of the present invention, wherein a player or the game selects and changes the character of one or more awards from a multiplier to a credit, and the game awards a combination of the awards to the player.

Referring now to FIG. 6, a schematic diagram of another example of a replacement embodiment of the present invention is illustrated, wherein a player or the game selects and changes the function or character of one or more awards from a multiplier to a credit, and the game awards a combination of the awards to the player. FIG. 6 illustrates a row of symbols 74, wherein each symbol contains indicia that masks an award; namely, the symbols, "P" through "T." Below the row of symbols, a plurality of hands of a player 54 illustrate the player selecting the symbols "P" and "S" and "T" from the row of symbols 74.

After selecting a symbol "P," the game preferably reveals the multiplier award associated with the symbol "P" (not shown) before displaying the replacement of 4 credits as illustrated in the row of symbols 76. Likewise, when the player selects the symbol "S" from the row 74, the game preferably reveals the multiplier award associated with the symbol "S" (not shown) before displaying the replacement of 10 credits in the row 76. Further, when the player selects the symbol "T" from the row 74, the game preferably reveals the multiplier award associated with the symbol "T" (not shown) before displaying the replacement of 2 credits in the row 76.

In this example, the game requires that the player convert at least one multiplier to a credit before entering a collect command 70 to end the bonus round. As above, the game requires at least one credit by which the game can multiply an accumulated multiplier. Unlike the previous example, the player can convert all multipliers to credits since the replacement embodiment does not require a multiplier. If the player converts all multipliers to credits, the game preferably ends the bonus round immediately upon the conversion of the last multiplier. No collect command 70 is necessary, however, the game can still employ said button.

After the player selects and converts a desired number of multipliers to credits, the game preferably reveals all the unconverted multipliers; namely, the 2× multiplier from the symbol "Q" and the 4× multiplier from the symbol "R," as illustrated by the row of symbols 76. The game preferably sums the unconverted multipliers for a total of 6×, as illustrated by the mathematical operation 78. Alternatively, the game can multiply the unconverted multipliers for a total of 8× (not shown).

The game also preferably adds the converted credits; namely, the 4 credits from the symbol "P," the 10 credits from the symbol "S" and the 2 credits from the symbol "T" for a total of 16 credits, as illustrated by the mathematical operation 78. Alternatively, the game can multiply the converted multipliers for a total of 80 credits (not shown). The game determines an ultimate award by multiplying the total converted credits by the total unconverted multipliers, i.e. 16 credits×6 or 96 credits as illustrated by the mathematical operation 78.

As illustrated in both examples, the game preferably reveals the values of converted and unconverted symbols. The game preferably reveals the value of a converted symbol immediately after the player selects the symbol. The game preferably does not reveal the values of unconverted symbols until the player finishes selecting, otherwise the player will obviously convert and eliminate the lowest valued credits. The game can alternatively reveal only the values of converted symbols, reveal only the values of unconverted symbols or not reveal the values of any symbols. It should be appreciated, however, that revealing awards or values increases player excitement and enjoyment.

The random replacement embodiment operates the same as described when the game rather than the player randomly replaces or converts values. The game does not require the input devices such as a touch screen when the controller rather than the player converts symbols. The reveal feature is also not limited to revealing selected symbols first since the player has no control over which symbols are converted. In all other respects, the random replacement embodiment operates the same whether the player or the game randomly converts symbols.

Figure 7:
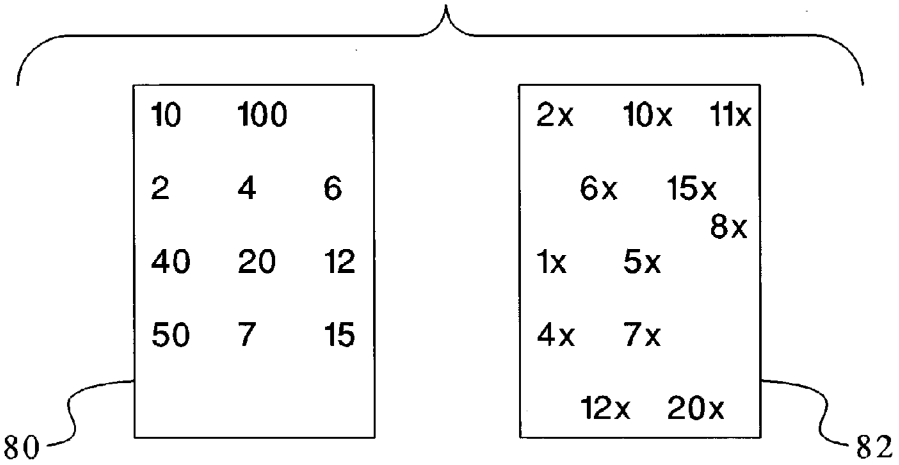
FIG. 7 is a schematic diagram of two databases in the controller of the present invention, wherein one database contains credits and the other contains multipliers.

Referring now to FIG. 7, two databases stored in the controller of the present invention are illustrated, wherein a credit database 80 contains a plurality of possible credits, while the multiplier database 82 contains a plurality of possible multipliers. The random replacement embodiment contemplates associating the values of the databases with the symbols of the present invention using a plurality of methods. Each of the methods will be described wherein a multiplier replaces a credit, however, each method is equally applicable to the example wherein a credit replaces a multiplier.

In one random replacement example, the game randomly assigns a credit from the database 80 before the player begins to replace credits with multipliers. Since the player can preferably choose to replace any credit in any order, the game preferably randomly pre-assigns a credit to each symbol. However, in an embodiment wherein the game provides a specific order, e.g., left to right, in which the player decides whether to replace a credit, the game can randomly assign a credit to a symbol just prior the player's decision. In either case, when the player selects to replace a credit of a particular symbol, the game preferably immediately randomly selects a multiplier for the selected symbol from the database 82. Alternatively, the game can wait until the player selects all desired credits to replace before randomly selecting a multiplier for each replacement from the database 82.

In another random replacement example, the game randomly pre-assigns a credit from the credit database 80 and a multiplier from the multiplier database 82 to each symbol before the player begins to replace credits with multipliers. The game discards or otherwise does not use a credit assigned to a symbol when the player replaces the symbol's credit value with a multiplier. Likewise, the game discards or otherwise does not use a multiplier assigned to a symbol when the player decides not to replace the symbol's credit value. It should be appreciated that this example is equally applicable when the game provides a specific order, such as left to right, in which the player decides whether to replace a credit.

In a further example, the game does not pre-assign either a credit from the database 80 or a multiplier from the database 82 to any of the symbols. That is, the game randomly assigns a credit or multiplier to each symbol after the player either replaces a credit with a multiplier or keeps the credit. In this embodiment, although it may appear so to a player, the game does not actually replace a credit with a multiplier or vice versa. The game randomly selects a credit from the database 80 if the player desires a credit for a symbol and randomly selects a multiplier from the database 82 if the player desires a multiplier for a symbol. The game can additionally randomly select a "replaced" credit for momentary display before awarding the "replacement" multiplier, which provides the appearance of a replacement.

Optimal Strategic Replacement Embodiment

It should be appreciated that revealing the credits of the credit database 80 and the multipliers of the database 82 provides the persistent and astute player with an opportunity to record values and determine averages for the credit database 80 and the multiplier database 82. Each gaming device is driven by one more algorithms that take into account such things as average payouts from a bonus round. Assuming that a gaming device does not switch algorithms, the game consistently provides the same average payouts, making charting and averaging possible. In most instances, knowing the average value of a bonus payout does not provide the player an advantage in the bonus round. In the present invention, however, knowing the average value of the credit database 80 and the multiplier database 82 enables the player to optimally play the gaming device. The present invention also contemplates programming the controller to optimally play the replacement embodiment for the player.

Figure 8:
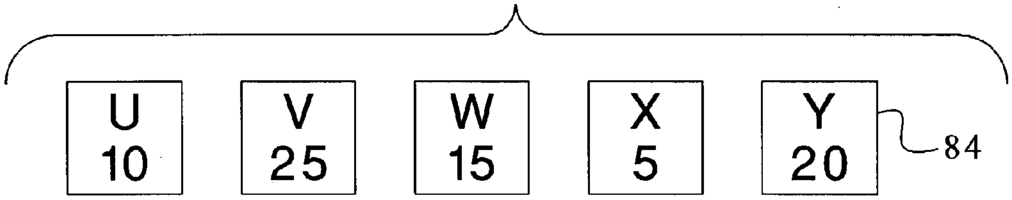
FIG. 8 is a schematic diagram of one strategic method, whereby the game plays the optimal strategy in bonus round of the present invention to determine which symbols to change.

Referring now to FIG. 8, for the purpose of explaining the present invention, we illustrate a simple example of one optimization method, whereby the game can determine which symbols to select and replace. In this method, the controller of the game knows the credits for each symbol and the average multiplier value of the multiplier database 82. That is, the controller knows that the credit for the symbols "U," "V," "W," "X" and "Y" of the row 84 is 10, 25, 15, 5 and 20, respectively. The controller also knows that the average multiplier 86 of the multiplier database 82 is 3×. The controller does not know the replacement multiplier award for each symbol "U" through "Y." It should be appreciated that in this example, the controller does not need to know the average credit of the credit database 80.

This optimization method includes the controller performing a plurality of calculations and one comparison, wherein the number of calculations equals the number of symbols. In the first calculation, the controller determines the optimal result for choosing four multipliers and keeping one credit, as indicated by the equation 88. The replacement embodiment requires at least one credit. The controller obviously keeps the most valuable credit, i.e., the 25 credits of the symbol "V." The controller not knowing the replacement multiplier assumes all four to be the average, i.e., 3×. Summing four 3× multipliers yields a total of 12× and multiplying the 25 credits by 12 yields an equation 88 result of 300 total credits.

In the second calculation, the controller determines the optimal result for choosing three multipliers and keeping two credits as indicated by the equation 90. The controller obviously keeps the two most valuable credits, i.e., the 25 credits of the symbol "V" and the 20 credits of the symbol "Y" for a total of 45 credits. The controller not knowing the replacement multiplier assumes all three to be the average, i.e., 3×. Summing three 3× multipliers yields a total of 9× and multiplying the 45 total credits by 9 yields an equation 90 result of 405 total credits.

In the third calculation, the controller determines the optimal result for choosing two multipliers and keeping three credits as indicated by the equation 92. The controller obviously keeps the three most valuable credits, i.e., the 25 credits of the symbol "V," the 20 credits of the symbol "Y," and the 15 credits of the symbol "W" for a total of 60 credits. The controller not knowing the replacement multiplier assumes both to be the average, i.e., 3×. Summing two 3× multipliers yields a total of 6× and multiplying the 60 total credits by 6 yields an equation 92 result of 360 total credits.

Repeating the above process for the choose one multiplier equation 94 yields a result of 210 total credits. Repeating the above process for the choose no multiplier equation 96 yields a result of 75 total credits. Comparing equations 88 through 96, the controller optimally chooses the choose three multiplier equation 90 and selects the "V" symbol, the "Y" symbol and the "W" symbol for the player to provide the player the best opportunity to achieve the maximum payout for the bonus round based on the average multiplier. The game randomly selects multipliers from the multiplier database 82 for each symbol and awards the player an ultimate number of credits.

Figure 9:
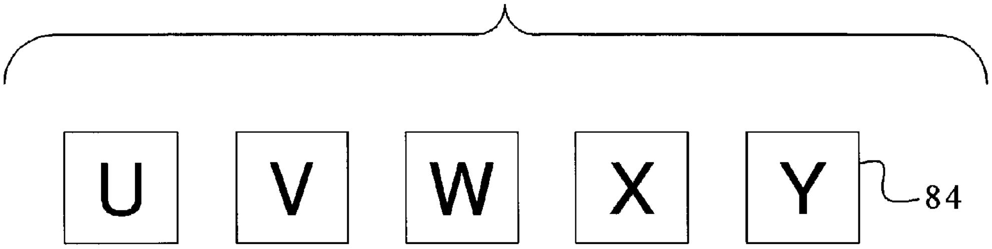
FIG. 9 is a schematic diagram of one illustration from a second strategic method, whereby the game plays optimal strategy in the bonus round of the present invention to determine how many symbols to change.

Referring now to FIG. 9, an example of another optimization method is illustrated, whereby the game can determine how many symbols to select and replace (but not the symbols to select and replace). In this method, the controller of the game knows the average credit of the credit database 80 and the average multiplier of the multiplier database 82. The controller does not know the specific credit or the multiplier associated with any of the individual symbols "U," "V," "W," "X" and "Y" of the row 84. For this example, the average credit 98 of the credit database 80 is 10 and the average multiplier 86 of the multiplier database 82 is 3× as before.

This optimization method includes the controller performing a plurality of iterations, each of which inform the controller of the optimal number of credits to convert to multipliers. The controller continues to perform the iterations until the optimal number to convert is zero. In this method, the controller has no idea which symbol to select and therefore picks a symbol to convert randomly. After selecting a symbol, the controller calculates a new average credit and average multiplier for the next iteration.

In the first iteration, the controller may select any symbol "U" through "Y" of row 84 and knows the average credit 98 is 10 and the average multiplier 86 is 3×. For the purpose of generally explaining the present invention, we use a simple example wherein the controller performs similar calculations as with the last example using the average credit 10 in place of the actual credits assigned to the symbols. In the choose four multipliers equation 100, the controller determines a result using the average 10 credits once and the average 3× multiplier four times to produce the result 120. In the choose three multipliers equation 102, the controller determines a result using the average 10 credits twice and the average 3× multiplier three times to produce the result 180. In the choose two multipliers equation 104, the controller determines a result using the average 10 credits three times and the average 3× multiplier twice to produce the result 180. In the choose one multiplier equation 106, the controller determines a result using the average 10 credits four times and the average 3× multiplier once to produce the result 120. In the choose no multiplier equation 108, the controller determines a result using the average 10 credits five times to produce the result 50. In this iteration, replacing two or three more credits will provide the player the best opportunity to achieve the maximum payout for the bonus round based on the average.

Figure 10:
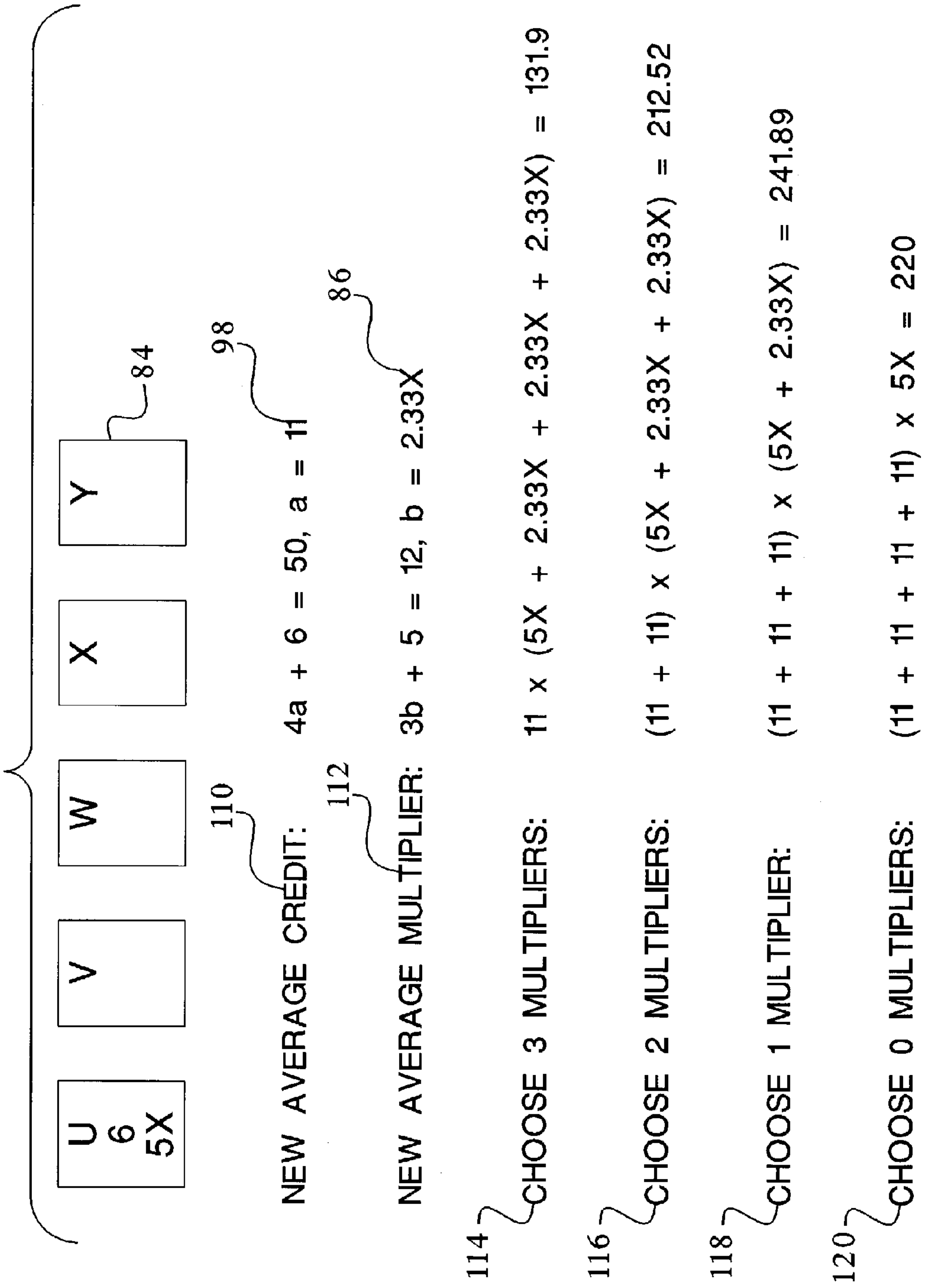
FIG. 10 is a schematic diagram of another illustration from a second strategic method, whereby the game plays the optimal strategy in bonus round of the present invention to determine how many symbols to change.

Referring now to FIG. 10, the controller randomly chooses the symbol "U" from the row 84. The game then randomly selects from the credit database 80 and the multiplier database 82 and reveals (to the player and to the controller) a 6 credit (which is replaced) and a 5× multiplier that replaces the 6 credit for the symbol "U." At this point, the player has been awarded a 5× multiplier, and the controller has to determine whether to replace another credit or keep the 5× multiplier and four remaining credits. Accordingly, the controller now knows that the average value of the remaining credits and the remaining multipliers are different because the game revealed a non-average credit (i.e., 6) and a non-average multiplier (i.e., 5×).

The controller performs a new average credit equation 110 with the knowledge that all five symbols should average 10 credits each, yielding a total of 50 credits. With the knowledge that the game assigned a 6 credit to the "U" symbol, the controller develops the equation 4a+6=50, where the 4 represents the remaining number of symbols and the "a" represents the new average credit. Solving for "a," the controller determines the new average credit to be 11. With the knowledge that the game assigned a 5× multiplier to the "U" symbol, and that the total number of multipliers if all five possible are converted is 15×, the controller develops the equation 4b+5=15, where the 4 represents the remaining possible convertible symbols and the "b" represents the new average multiplier. Solving for "b," the controller determines the new average multiplier to be 2.5×.

In the second iteration, the controller has the symbols "V," "W," "X" and "Y" of row 84 to choose from and knows the average credit 98 is now 11 and the average multiplier 86 is now 2.5×. In the choose three multipliers equation 114, the controller determines a result using the average 11 credits once, the known 5× multiplier and the average 2.5× multiplier three times to produce the result 137.5. In the choose two multipliers equation 116, the controller determines a result using the average 11 credits twice, the known 5× multiplier and the average 2.5× multiplier two times to produce the result 220. In the choose one multiplier equation 118, the controller determines a result using the average 11 credits three times, the known 5× multiplier and the average 2.5× multiplier one time to produce the result 247.5. In the choose no multipliers equation 120, the controller determines a result using the average 11 credits four times and the known 5× multiplier to produce the result 220. In this iteration, replacing 1 more credit is optimal, and importantly, the controller's next step is to select a symbol. This will provide the player the best opportunity to achieve the maximum payout for the bonus round based on the known averages at this point in time.

Figure 11:
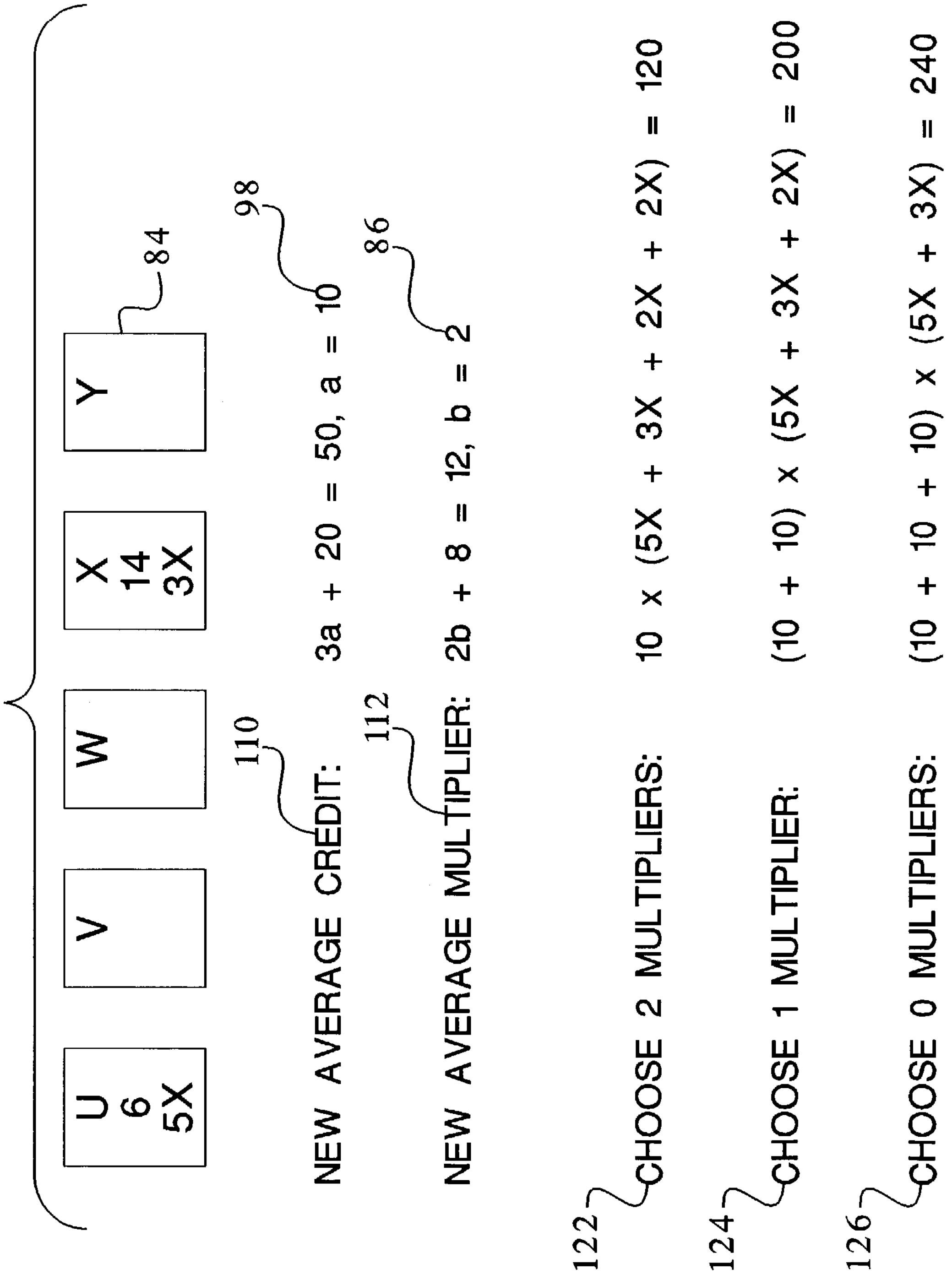
FIG. 11 is a schematic diagram of a further illustration from a second strategic method, whereby the game plays the optional strategy in bonus round of the present invention to determine how many symbols to change.

Referring now to FIG. 11, the controller randomly chooses the symbol "X" from the row 84. The game then randomly selects from the credit database 80 and the multiplier database 82 and reveals (to the player and to the controller) a 14 credit (which is replaced) and a 3× multiplier that replaces the 14 credit for the symbol "X." At this point, the player has been awarded a 5× multiplier and a 3× multiplier, and the controller has to determine whether to replace another credit or keep the 8× total multiplier and the three remaining unknown credits.

The controller performs another new average credit equation 110. With the knowledge that the game assigned a 6 credit to the "U" symbol and a 14 credit to the "X" symbol, the controller develops the equation 3a+20=50, where the 3 represents the remaining number of symbols and the "a" represents the new average credit. Solving for "a," the controller determines the new average credit to be 10. With the knowledge that the game assigned a 5× multiplier to the "U" symbol and a 3× multiplier to the "X" symbol, the controller develops the equation 3b+8=15, where the 3 represents the remaining possible convertible symbols and the "b" represents the new average multiplier. Solving for "b," the controller determines the new average multiplier to be 2.33× (rounded).

In the third iteration, the controller has the symbols "V," "W" and "Y" of row 84 to choose from and knows the average credit 98 is now 10 and the average multiplier 86 is now 2.33×. In the choose two multipliers equation 122, the controller determines a result using the average 10 credits once, the known 5× multiplier, the known 3× multiplier and the average 2.33× multiplier two times to produce the result of 126.6. In the choose one multiplier equation 124, the controller determines a result using the average 10 credits twice, the known 5× multiplier, the known 3× multiplier and the average 2.33× multiplier one time to produce the result of 206.6. In the choose no multipliers equation 126, the controller determines a result using the average 10 credits three times, the known 5× multiplier and the known 3× multiplier to produce the result 240. In this iteration, replacing no credits is optimal, and assuming that the symbols "V," "W," and "Y" will yield average expected values, the controller's next step is to automatically collect the remaining credits and award the player an ultimate award. This will provide the player the best opportunity to achieve the maximum payout for the bonus round based on the averages.

It should be appreciated that the controller or the player can use any suitable method based on the known information at each point during the bonus round to play the optimal strategy. It should be appreciated that in the example provided in FIGS. 9 through 11, the average credits and the average multiplier are based on the actual credits and multipliers selected for association with each of said selections.

In an alternative but preferred embodiment of the present invention, the average credits and average multiplier will remain constant because each of the credits and multipliers associated with the symbols will be selected from a separate and unique pool of credits and a separate and unique pool of multipliers and therefore, the averages will not change during the bonus game. Thus, it is preferred that the average credit and multiplier value is independent of the previously revealed values. Also, there may be a plurality of multiplier databases 82 each with a different average multiplier value used for each level or replacement. Database 82 may be used for the first replacement and a variation of database 82 may be used for the second replacement, a second variation for the third replacement, etc. Similarly, a plurality of credit databases 80 may be employed in the present invention.

Multiple Levels and Accept/Reject Feature

Each embodiment previously illustrated; namely, the elimination, random replacement and optimal replacement, has been described as a single level or row of symbols, wherein the game awards a player some accumulated award from some or all of the symbols. It should be appreciated that the present invention contemplates providing a plurality of different rows of symbols, wherein each row contains an elimination or replacement sequence, and the player wins a separate award from each of said sequences. The present invention contemplates accumulating the awards from the separate sequences. The present invention also contemplates providing an accept/reject feature, wherein the game rejects an award that is under a predetermined value and enables the player to play as many sequences as is necessary to generate an acceptable award.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A method of operating a gaming device comprising the steps of:

displaying a plurality of awards to a player in a play of a game;

enabling the player to selectively and individually replace at least one of the plurality of awards with at least one hidden replacement award associated with said plurality of awards in said same play of the game; and providing the player the plurality of awards not replaced and any hidden replacement award which replaces each of the selectively and individually replaced awards in the play of the game.

2. The method of claim 1, wherein each award includes a value which is initially hidden from the player.

3. The method of claim 1, wherein the hidden replacement awards are chosen from the group consisting of a game credit, a multiplier, a number of picks from a group of credits, and a number of picks from a group of multipliers.

4. The method of claim 1, wherein the awards are chosen from the group consisting of a game credit, a multiplier, a number of picks from a group of credits, and a number of picks from a group of multipliers.

5. The method of claim 1, wherein the plurality of awards are credits, and the at least one hidden replacement award is a multiplier.

6. The method of claim 1, wherein the plurality of awards are multipliers, and the at least one hidden replacement award is a credit.

7. The method of claim 1, which includes operating the gaming device through a data network.

8. The method of claim 7, wherein the data network is an internet.

9. A method of operating a gaming device comprising the steps of:

displaying a plurality of awards to a player in a play of a game;

strategically determining to selectivity and individually replace at least one of the plurality of awards with at least one hidden replacement award associated with said plurality of awards in said play of the game; and providing the player the plurality of awards not replaced and any hidden replacement award which replaces each of the selectively and individually replaced awards in the play of the game.

10. The method of claim 9, wherein each award includes a value which is initially hidden from the player.

11. The method of claim 9, which includes operating the gaming device through a data network.

12. The method of claim 11, wherein the data network is an internet.

13. A method of operating a gaming device comprising the steps of:

displaying a plurality of awards to a player in a play of a game;

randomly selecting at least one of the plurality of awards to replace with at least one hidden replacement award and selectively and individually replacing said selected award with the hidden replacement award in said same play of the game; and providing the player the plurality of awards not replaced and the hidden replacement award which replaces each of the selectively and individually replaced awards in said play of the game.

14. The method of claim 13, wherein each award includes a value which is initially hidden from the player.

15. The method of claim 13, wherein the awards are chosen from the group consisting of a game credit, a multiplier, a number of picks from a group of credits, and a number of picks from a group of multipliers.

16. The method of claim 13, wherein the hidden replacement award is chosen from the group consisting of a game credit, a multiplier, a number of picks from a group of credits, and a number of picks from a group of multipliers.

17. The method of claim 13, wherein the plurality of awards are credits, and the at least one hidden replacement award is a multiplier.

18. The method of claim 13, wherein the plurality of awards are each multipliers, and the at least one hidden replacement award is a credit.

19. The method of claim 13, wherein the awards are hidden from the player.

20. The method of claim 13, which includes operating the gaming device through a data network.

21. The method of claim 20, wherein the data network is an internet.

* * * * *

UNITED STATES PATENT AND TRADEMARK OFFICE

CERTIFICATE OF CORRECTION

PATENT NO. : 6,971,955 B2
DATED : December 6, 2005
INVENTOR(S) : Anthony J. Baerlocher et al.

It is certified that error appears in the above-identified patent and that said Letters Patent is hereby corrected as shown below:

Title page,
Item [56], References Cited, U.S. PATENT DOCUMENTS, change "6,174,235 B1 1/2001" to -- 6,174,235 1/2001 --.

Column 1,
Line 9, change "Ser. No. 10/173,283 filed" to -- Ser. No. 10/173,283, filed --.
Line 10, change "U.S. Pat. No. 6,575,830 which" to -- U.S. Pat. No. 6,575,830, which --.

Signed and Sealed this

Fourth Day of April, 2006

JON W. DUDAS
*Director of the United States Patent and Trademark Office*